United States Patent [19]
Kidwell et al.

[11] Patent Number: 5,464,957
[45] Date of Patent: Nov. 7, 1995

[54] MANUAL ARC WELDING SPEED PACER

[75] Inventors: J. Jeffrey Kidwell, Louisville; Stuart E. Reed, Homeworth; Patrick M. Ryan, Alliance; Dennis D. Harwig, Canton; E. Allen Womack, Jr., Akron, all of Ohio

[73] Assignee: The Babcock & Wilcox Company, New Orleans, La.

[21] Appl. No.: 9,696

[22] Filed: Jan. 27, 1993

[51] Int. Cl.⁶ .................................................. B23K 9/095
[52] U.S. Cl. ................ 219/130.01; 219/136; 219/137 R; 340/815.69
[58] Field of Search ...................... 219/130.01, 130.21, 219/136, 137 R; 434/234; 84/484; 340/815.69

[56] References Cited

U.S. PATENT DOCUMENTS

| | | | |
|---|---|---|---|
| 3,268,812 | 8/1966 | Meyer et al. | 324/71 |
| 3,675,243 | 7/1972 | Landuyt | 84/484 |
| 4,118,620 | 10/1978 | Wall, Jr. et al. | 219/124.32 |
| 4,132,014 | 1/1979 | Schow | 434/234 |
| 4,234,777 | 11/1980 | Balfanz | 219/125.1 |
| 4,305,096 | 12/1981 | Yokoshima et al. | 358/101 |
| 4,375,026 | 2/1983 | Kearney | 219/130.01 |
| 4,396,904 | 8/1983 | Hanaoka | 340/815.69 |
| 4,426,565 | 1/1984 | Ruter | 219/130.01 |
| 4,971,059 | 11/1990 | Niewald | 340/815.69 |

*Primary Examiner*—Clifford C. Shaw
*Attorney, Agent, or Firm*—Daniel S. Kalka; Robert J. Edwards

[57] ABSTRACT

An apparatus and method for pacing the application of a manual weld along the weld line generates beeps or light flashes at a rate which can be correlated by the welder with markings along the weld line. As each beep or flash is perceived, the welder should reach the next marking. Spacing between the markings determines the desired rate at which the weld is being applied. Alternatively, sequentially lightable areas are distributed along the weld line and sequentially lit a desired rate. The welder chases the sequence along the weld line to achieve the optimum rate of welding.

4 Claims, 2 Drawing Sheets

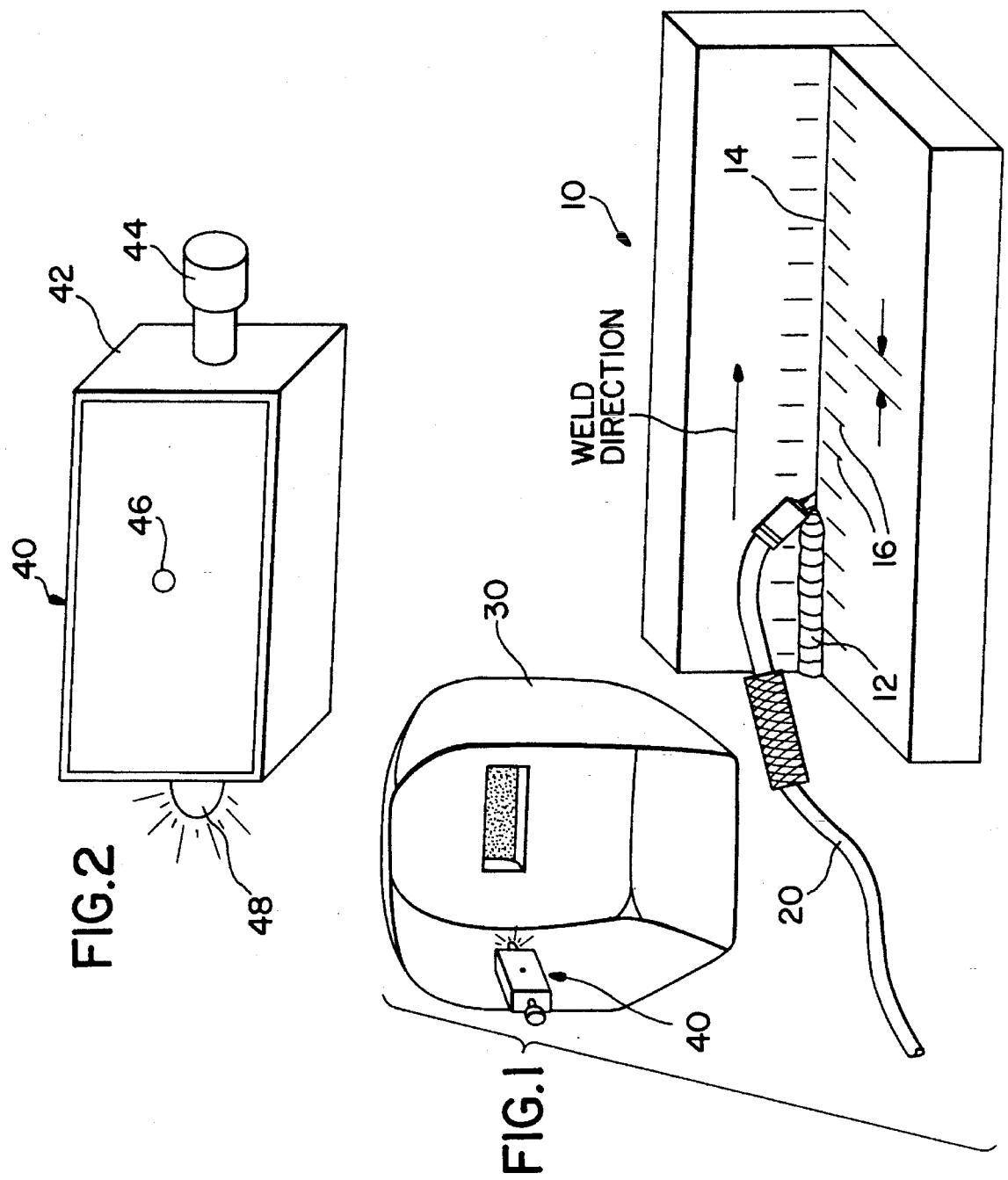

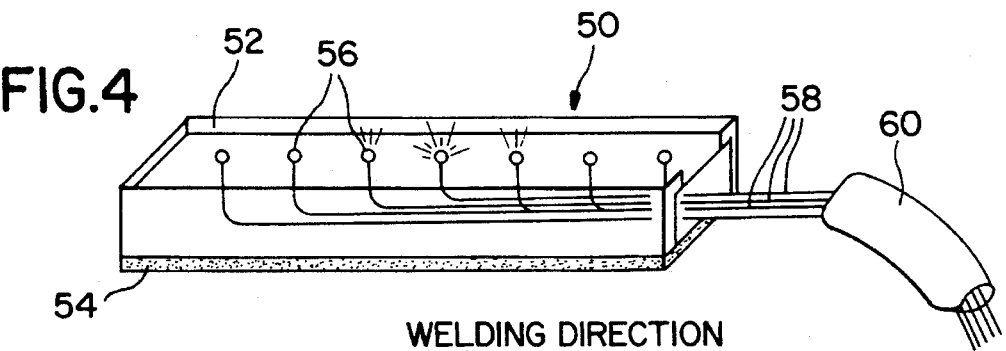
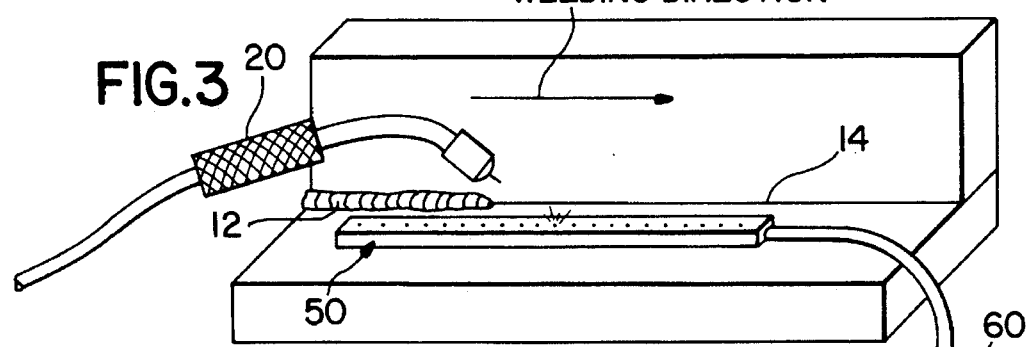
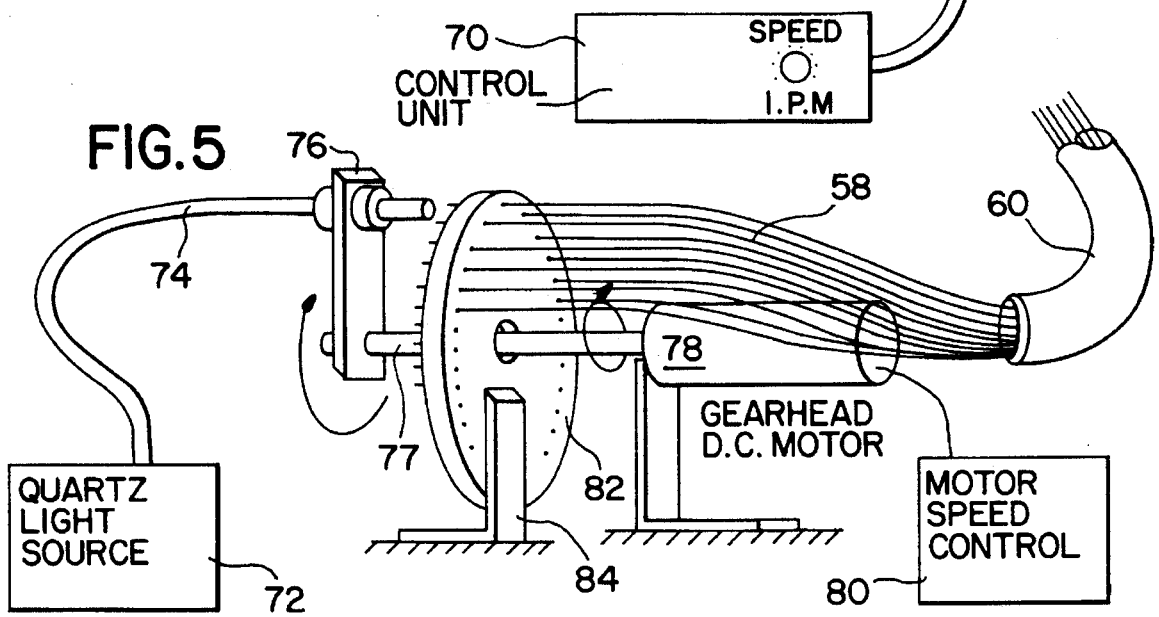

MANUAL ARC WELDING SPEED PACER

FIELD AND BACKGROUND OF THE INVENTION

The present invention relates in general to manual arc welding, and in particular to a new and useful method and apparatus for training a welder to perform manual arc welding by pacing his or her welding speed.

One critical parameter in manual flux core arc welding is welding speed. As the welding speed is increased or decreased from established allowable limits, the weld strength properties may become unacceptable. Average welding speed can be checked by measuring the time it takes to make a specified length weld, but, the welder does not know if the speed is correct as the weld is made.

One training system currently available is the Lenco LT-3000 Weld-Trainer. This computer controlled unit allows the operator to simulate actual weld conditions in a classroom setting without actually consuming welding rods or test plates.

U.S. Pat. No. 4,118,620 to Wall, Jr., et al. relates to a computerized system for translating a torch head. A welding torch is advanced along a track by means of a skate with the output of the skate drive motor controlling the speed of the torch head assembly.

U.S. Pat. No. 3,268,812 to Meyer et al. describes an apparatus for determining the location, size, shape, focus and energy distribution of an electron beam which may be used for welding.

U.S. Pat. No. 4,234,777 to Balfanz describes a programmed welding machine with weld head speed override.

U.S. Pat. No. 4,305,096 to Yokoshima, et al. describes a method of detecting a weld line from the video signal of the weld. The video signal is compared with a predetermined threshold so as to be binary-coded into a signal representing a dark part and a signal representing a brighter part of the weld.

A need remains for an apparatus or method that can help a welder gauge the speed at which the weld is being made on a manual basis.

SUMMARY OF THE INVENTION

A first embodiment of the invention is a self contained module containing a beeper and light mounted in the welder's helmet. When powered up the light blinks and the beeper sounds every ten seconds. Before making the weld, reference marks are drawn on the surface to be welded at specified intervals (i.e. every 2 inches). As the weld is being made the welder attempts to pass each mark with the welding torch every time the unit beeps and flashes. By spacing the marks at the proper intervals any weld speed could be gauged.

The construction of the invention consists of an integrated circuit (such as a 555 timer), piezoelectric beeper, LED (light emitting diode), battery and switch. A variable resistor and capacitor in the circuit are used to set the beep and flash rate.

A second embodiment of the invention consists of a fiber optic array mounted in a small compact housing that is positioned adjacent the area to be welded. The optical fibers, positioned ¼" apart, sequentially light up and "chase" along the length of the housing at the optimum welding speed. This provides a visual reference for the welder to follow as the weld is being made.

Accordingly, an object of the present invention is to provide an apparatus for pacing the application of a manual weld along a weld line, comprising: perceivable signal generating means for generating signals which are perceivable by a welder during the application of a manual weld; and temporal means operatively connected to the signal generating means for correlating the timing of the generation of the perceivable signals to match a desired rate of application of the manual weld along the weld line.

A further object of the present invention is to provide a method for pacing the application of a manually applied weld along weld line which uses timed signals perceivable by the welder and generated at a rate corresponding to the desired rate of application of the weld.

A still further object of the invention is to provide an apparatus and method which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which the preferred embodiments of the invention are illustrated.

BRIEF DESCRIPTION OF THE DRAWINGS

In the drawings:

FIG. 1 is a perspective view of an apparatus used according to one embodiment of the present invention;

FIG. 2 is a perspective view of the signal generating mechanism used in the embodiment of FIG. 1;

FIG. 3 is a perspective view of a second embodiment of the invention;

FIG. 4 is an enlarged portion of the embodiment of FIG. 3; and

FIG. 5 is a perspective view of a temporal control mechanism for adjusting the speed of the signals generated by the apparatus of FIG. 3.

DESCRIPTION OFT HE PREFERRED EMBODIMENTS

Referring to the drawings in particular, the invention embodied in FIGS. 1 and 2 comprises an apparatus generally designated 10 for pacing the application of a weld 12 along a weld line 14 in a welding direction. Weld 12 is applied by a welder utilizing a manual welding gun 20 of known design. The welder utilizes a conventional welding mask or helmet 30 which, according to the present invention, is outfitted with a beeper/flasher module generally designated 40 mounted on an inner surface of the welding helmet. As shown in FIG. 2, module 40 comprises a housing 42 having a large push button 44 which, in the mounted position of the module in helmet 30, is accessible from the rear and large enough to be easily activated by a welder wearing a welding glove. Internally, housing 42 includes a battery powered circuit consisting, for example, of an I.C. 555 timer (not shown) of conventional design. The timer drives a piezoelectric beeper 46 which has an outlet near the ear of a welder wearing the helmet or mask 30. The circuit in housing 42 is also connected to an LED or other light-emitting means 48 positioned near the front of the housing and thus peripherally visible to the welder wearing the mask 30. The timer is adjustable and can be set to a desired welding rate. The cadence of beeping and flashing of the beeper 46 and LED 48 give the welder timed perceivable signals for regulating the rate at which the weld 12 is applied. To correlate the beeping and/or flashing with welding rate, markings 16, for example, of soapstone are previously placed along the weld line 14 at regular intervals, for example, ¼ inch to three inches apart. The object for the welder is to reach each marking as each successive perceivable signal (either beep or light flash or both) is generated. For example, with the markings 16 at 1 inch intervals and a 10-second interval between a beep or flash, a welding rate of 6 inches per minute can be achieved. With markings 16 at 2 inch intervals and again at a 10-second spacing between perceivable signals, 12 inches per minute is achieved for the welding rate. An 18 inch per minute welding rate can be achieved if markings 16 are three inches apart.

Alternatively to changing the spacing of the markings, the time between beeps or flashes can be adjusted.

Using the cadence of beeps and/or flashes as feedback, the welder can either speed up or slow down so that the welder passes each mark as a signal is heard or seen. The embodiment of FIGS. 1 and 2 thus functions as a training tool or can actually be used during welding to help the welder apply the weld at optimum rate.

FIGS. 3–5 show another embodiment of the invention which utilizes a fiber optic array generally designated 50 which is placed to extend along the desired weld line 14. In FIGS. 3–5 the same reference numerals are used as in FIGS. 1 or 2, to designate the same of functionally similar parts.

As shown in FIG. 4, array 50 comprises a housing 52 which contains a plurality of aligned light emitting areas 56 which are, for example, the ends of optical fibers 58 contained within an optical cable sheath 60. As shown in FIG. 3, the optical cable or sheath 60 connects the array 50 to a control unit 70 which contains equipment for controlling the rate at which areas 56 are sequentially lit along the weld line 14 in the welding direction. As with the embodiment of FIG. 1, the array 50 gives the welder a perceivable timed sequence of signals which are correlated to the rate of weld application along the weld line 14 and which can be followed to either increase or decrease the manual welding speed to match the optimum required or desired speed.

Advantageously, the array housing 52 has a magnetic base 54 which is used to temporarily but firmly hold the array to a surface of the members being welded.

FIG. 5 shows an embodiment of the temporal control mechanism for the light areas 56 which comprises a quartz light source 72 connected by optical fibers or an optical cable 74 to a support 76 mounted to the end of a shaft 77 rotated by a DC motor with gear head 78. The speed of motor 78 is controlled by a conventional motor speed control 80 which regulates the rotation rate of the support 76. The end of cable 74 at support 76 is journalled so that the cable is not twisted as shaft 77 rotates.

The opposite ends of the fibers 58 of cable 60 are individually mounted at spaced locations around the periphery of a disk 82 held by a support 84. With shaft 77 rotating, light from the end of fiber 74 is sequentially applied to the ends of fibers 58. This sequentially lights the light-emitting ends of the fibers at 56, lying along the weld line 14.

Instead of a DC motor with gear head, 78 may represent a stepper motor. In either case, the sequence of lights chase the weld line and can be followed by the welder. Different welding rates are achieved by changing the rotation rate of the motor 78.

One alternative to the fiber optic pacer is to use the fibers to pick up light from the weld as it is being made. The fibers would be connected to an electronic processing device that would look at the light from the individual, equally spaced fibers and compare the measured calculated speed rate to the actual rate required. A simple audio visual system can be installed in the welder's helmet to indicate if the proper speed is being maintained and if the speed needs to be increased or decreased.

The optical pacer can also be made in any length and flexibility. This allows it to be mounted to curved surfaces.

Both embodiments of the invention can be used as training devices to allow welders to visualize proper welding speed and to practice techniques. the systems also have the advantage of being usable during actual production welding.

Other advantages of the invention include the fact that systems can be used in loud environments and the weld speed can be paced on any weld orientation (such as overhead welding).

Since the systems of the invention are non-verbal, language barriers would not present a problem. The beeper light system could be standardized and weld marking scales could be provided to the welders for specific welding speeds. For example, a metal scale would have marks every 2 inches, this scale would be for a welding speed of 12 inches per minute (10 seconds to travel 2 inches).

The audible beeper system also has the advantage of allowing the welder to concentrate visually on the welding and just listen for the indication of welding speed. That is, if the welder reaches the mark before he hears the beep, the welding rate is too fast. The audible beeper system also has the advantage of being self-contained and very inexpensive to produce.

Both embodiments can be turned on and off by the welder as required.

The biggest advantage to be gained is that the quality and repeatability of the welds would improve. This would save time and money by eliminating weld rework.

While a specific embodiment of the invention has been shown and described in detail to illustrate the application of the principles of the invention, it will be understood that the invention may be embodied otherwise without departing from such principles.

What is claimed is:

1. A method for pacing the application of a manual weld along a weld line, comprising the steps of:

providing a weld line with markings spaced at regular intervals;

positioning a module for generating perceivable signals in a welding helmet;

generating discrete, timed signals which are perceivable to a welder by the module in the welding helmet as the welder applies a manual weld along the weld line; and temporally controlling the signals at a selected rate corresponding to a rate of welding along the weld line based on the spaced markings.

2. A method according to claim 1, wherein the generating step comprises the step of generating audible signals.

3. A method according to claim 1, wherein the generating step comprises the step of generating visual signals.

4. A method according to claim 1, wherein the generating step comprises the step of generating both visual and audible signals.

\* \* \* \* \*